United States Patent [19]

Gramms et al.

[11] Patent Number: 5,512,167

[45] Date of Patent: Apr. 30, 1996

[54] BACKPULSE PISTON ASSEMBLY FOR CROSSFLOW FILTERS

[75] Inventors: Lorne C. Gramms, Calgary, Canada; Ronald W. Bowman; Robert R. Craycraft, both of Ventura, Calif.

[73] Assignee: Case Engineering & Laboratory, Inc., Ventura, Calif.

[21] Appl. No.: 257,507

[22] Filed: Jun. 8, 1994

[51] Int. Cl.$^6$ .................................................. B01D 65/02
[52] U.S. Cl. ................. 210/108; 210/321.69; 210/412; 210/411; 417/392
[58] Field of Search .................................. 417/398, 399, 417/401, 375, 392, 437; 210/108, 321.69, 411, 412, 636, 138, 143, 333.01, 497.1; 55/302

[56] References Cited

U.S. PATENT DOCUMENTS

| | | | |
|---|---|---|---|
| 3,837,765 | 9/1974 | Weise et al. | 417/399 |
| 4,755,290 | 7/1988 | Neumann et al. | 210/412 |
| 4,955,953 | 9/1990 | Kayser | 417/399 |
| 5,011,603 | 4/1991 | Katoh et al. | 210/497.1 |
| 5,047,154 | 9/1991 | Comstock et al. | 210/321.69 |
| 5,128,107 | 7/1992 | Katoh et al. | 210/411 |
| 5,234,605 | 8/1993 | Reipur et al. | 210/333.01 |

FOREIGN PATENT DOCUMENTS

| | | | |
|---|---|---|---|
| 527417 | 7/1956 | Canada | 210/412 |
| 1080977 | 5/1960 | Germany | 210/412 |
| 4-83581 | 3/1992 | Japan | 210/321.69 |
| 4-83582 | 3/1992 | Japan | 210/321.69 |

Primary Examiner—Joseph W. Drodge
Attorney, Agent, or Firm—Harrison & Egbert

[57] ABSTRACT

A filtration system including a crossflow filter having an interior membrane and a backpulse piston-and-cylinder assembly having a first port connected to a permeate outlet of the crossflow filter and a second port positioned at a different location than the first port. The piston-and-cylinder assembly has an interior piston movable between a first position blocking fluid flow between the first port and the second port and a second position permitting fluid flow between the first and second ports. An actuator is connected to the piston so as to move the piston from the second position to the first position. The piston defines an interior chamber within the assembly. The first port and the second port are in fluid communication with the interior chamber when the piston is in the second position. A controller is connected to the actuator for causing the movement of the piston relative to a temporal event or to a pressure differential across the interior membrane of the crossflow filter.

16 Claims, 2 Drawing Sheets

FIG. 1
PRIOR ART
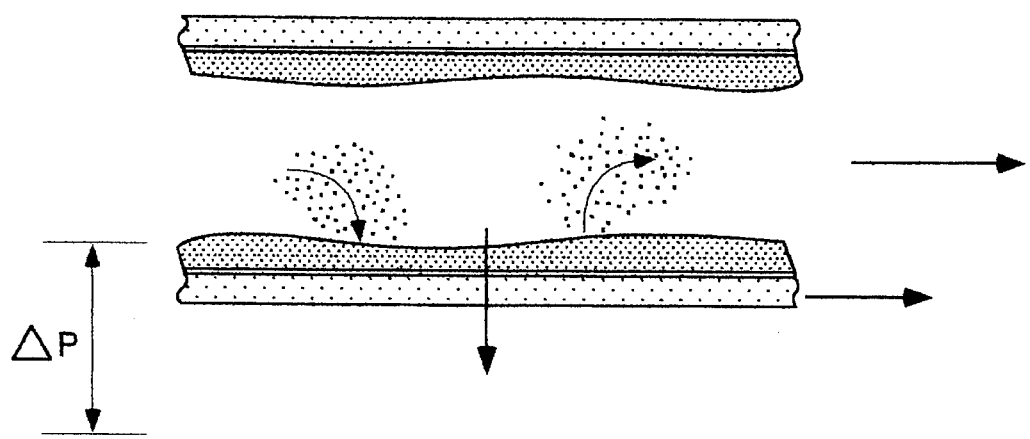
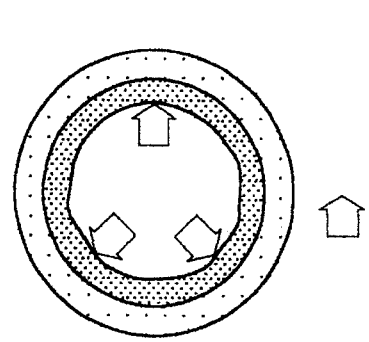
FIG. 2
PRIOR ART
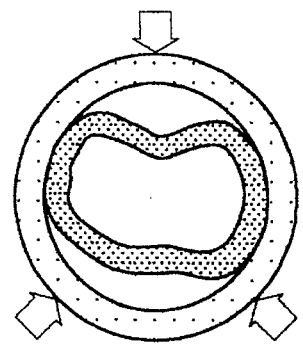
FIG. 3
PRIOR ART

BACKPULSE PISTON ASSEMBLY FOR CROSSFLOW FILTERS

TECHNICAL FIELD

The present invention relates to devices for the backflushing of crossflow filters. More particularly, the present invention relates to piston-and-cylinder assemblies which are used for the backflushing and backwashing of filters.

BACKGROUND ART

Crossflow microfiltration systems play a major role in the treatment of water and wastewater for domestic and industrial purposes. Ceramic crossflow microfiltration has been applied to several industrial produced water systems in recent years. The success of the ceramic crossflow microfiltration system in producing industrial waters is dependent on the process performance, along with the operational and maintenance parameters.

Advanced water filtration systems are rapidly becoming more widely used for treating industrial and domestic water. Several of the more advanced systems incorporate crossflow microfiltration systems (CFM). CFM is a new branch of membrane technology which filters particles from liquids of a size between conventional filtration and ultrafiltration. In the CFM process, feed water is passed tangentially across the surface of a porous membrane, as shown in FIG. 1. The feed water enters the tube and product water passes tangentially through the circular membrane channels. The solids which are filtered out form a dynamic membrane along the wall of the tube (membrane) which is constantly eroded and moved by the hydrodynamic shear exerted by the cross flow, which causes reentrainment of particles from the dynamic membrane into the feed/recycle flow. This continuous cross flow action, and accompanying hydrodynamic shear, reduces the concentration of the suspended solids at the membrane surface, and permits passage of the suspended solids across the face of the membrane with minimal fouling and clogging at the membrane solids interface.

It has been found that in many cases there is a rapid decrease in the filtration rate, in spite of high crossflow velocities. The reason for this phenomenon is the wide range of particle sizes in the suspension, the finest particles often being smaller than the membrane pore size which results in membrane penetration and subsequent pore structure clogging. In order to minimize the effect of this phenomenon, another step is conventionally added to the process, i.e. the pulsed backflushing of the membrane. This backflushing is a periodic rapid reversal of flow direction through the membrane. This arrangement is illustrated in FIGS. 2 and 3 herein. This momentary flow reversal generally cleans up the surface of the membrane and allows the particles to be swept away in the cross flow of the liquid.

Current CFM systems use a backpulse system which is complex and has several inherent operational problems. Conventional backpulse systems pump product water, from a small storage tank, into an accumulator backpulse tank so that the accumulator tank has a pressure of twenty to fifty p.s.i. higher than the CFM operating system pressure. To provide a rapid flow reversal, the accumulator tank must contain an inert compressible gas, normally nitrogen. As a result, numerous valves, pressure switches, level gages, and a programmable logic controller are required to operate the system.

It is an object of the present invention to provide a filtration system that ensures that fresh filter fluid is used for the backpulsing.

It is another object of the present invention to provide a filtration system that eliminates cool down and/or post-precipitation of the permeate fluid.

It is a further object of the present invention to provide a filtration system that optimizes the volume of permeate fluid used for backflushing.

It is another object of the present invention to minimize the number of components required for the proper backpulsing of the filter.

It is still another object of the present invention to provide a backpulse system that is easy to control, easy to use, and relatively inexpensive.

These and other objects and advantages of the present invention will become apparent from a reading of the attached specification and appended claims.

SUMMARY OF THE INVENTION

The present invention is a filtration system that comprises a crossflow filter having an interior membrane and a backpulse piston-and-cylinder assembly having a first port connected to a permeate outlet of the crossflow filter and a second port positioned at a different location than the first port. The crossflow filter includes a feed inlet, a concentrate outlet and a permeate outlet. The interior membrane is positioned adjacent to the permeate outlet. The assembly has an interior piston movable between a first position which blocks fluid flow between the first and second ports and a second position permitting fluid flow between the first and second ports. An actuator is connected to the piston so as to move the piston from the second position to the first position.

The crossflow filter has a system fluid pressure between the feed inlet and the concentrate outlet. The actuator exerts a pressure on the piston greater than the system fluid pressure. Specifically, the pressure on the piston is between 20 to 50 p.s.i. greater than the system fluid pressure.

The piston defines an interior chamber in the assembly. The first port and the second port are in fluid communication with the interior chamber when the piston is in the second position. The piston, in the first position, is in fluid-tight sealing relationship over the second port.

The actuator includes a pneumatic cylinder having a rod connected to the piston. A source of pneumatic pressure is connected to the pneumatic cylinder so as to move the piston from the second position to the first position. The pneumatic cylinder has a bleed valve connected thereto. The bleed valve allows air to flow from the pneumatic cylinder relative to a movement of the piston from the first position to the second position. The piston is connected to the rod for an adjustable distance from the pneumatic cylinder.

A controller is connected to the actuator so as to cause the movement of the piston relative to a temporal event. Alternatively, the controller is connected to the actuator so that the piston moves relative to a pressure differential across the interior membrane of the crossflow filter.

The first port is positioned at an end of the cylinder. The first port has a longitudinal axis aligned with a direction of travel of the piston. The second port is positioned on a side of the cylinder. The second port has a longitudinal axis transverse to a longitudinal axis of the first port.

BRIEF DESCRIPTION OF THE DRAWINGS

FIGS. 1–3 are illustrations of prior art crossflow microfiltration systems.

DETAILED DESCRIPTION OF THE INVENTION

Figure 4:
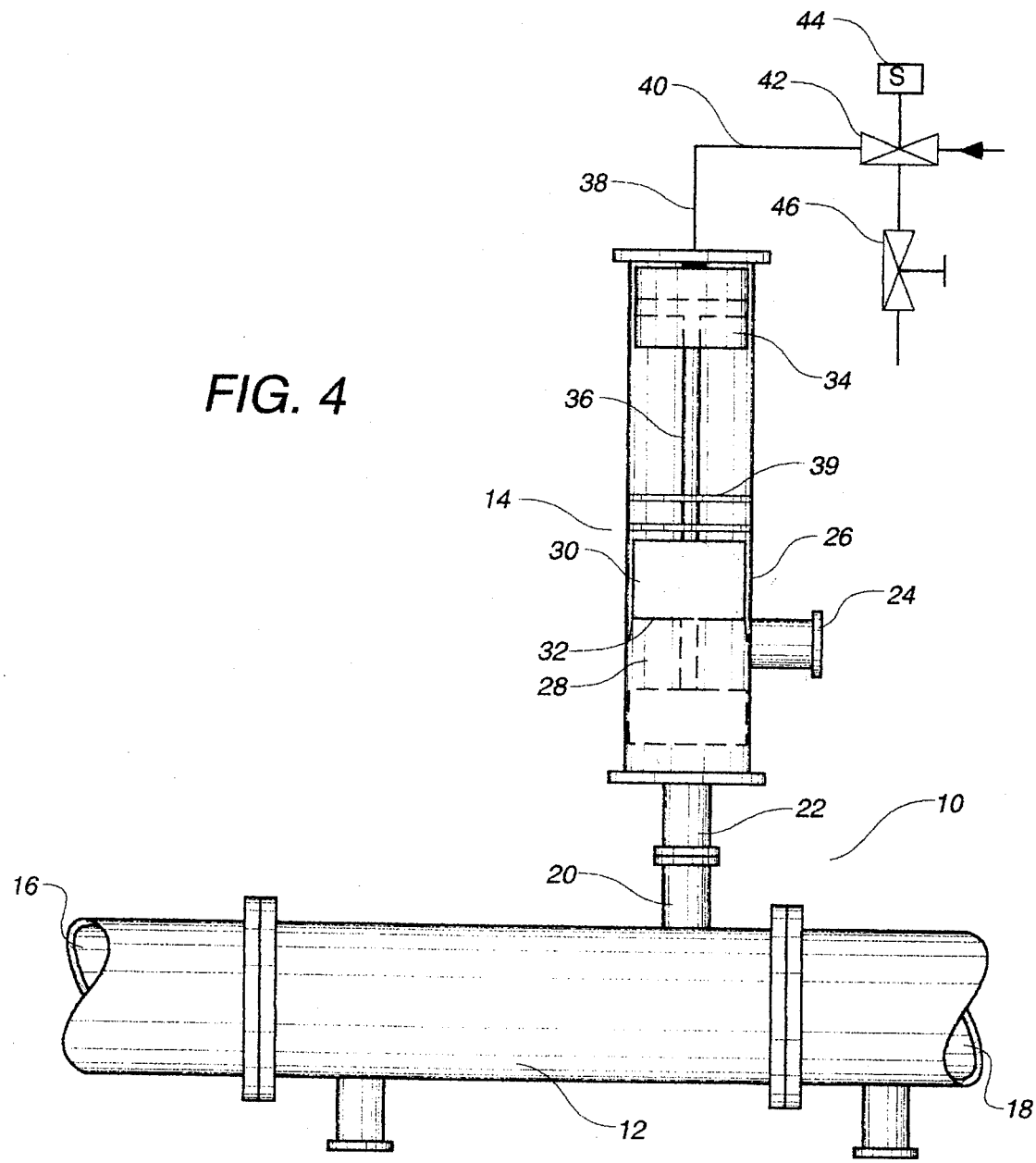
FIG. 4 is a diagrammatic illustration of the filtration system in accordance with the present invention.

Referring to FIG. 4, there is shown the filtration system 10 in accordance with the present invention. The filtration system 10 includes a crossflow filter 12 and a backpulse piston-and-cylinder assembly 14. The crossflow filter 12 is of the type having an interior membrane (described in conjunction with FIGS. 1–3). The crossflow filter 12 has a feed inlet 16, a concentrate outlet 18, and a permeate outlet 20. As can be seen, the backpulse piston-and-cylinder assembly 14 is connected to the permeate outlet 20. In normal use, the permeate outlet will pass the permeate liquid which has passed through the interior membrane. The crossflow filter 12 can be a part of an overall chemical process. The liquid that passes through the interior membrane and into the permeate outlet 20 will be the filtered liquid. The crossflow filter 12 can be a microfiltration module or an ultrafiltration module.

The backpulse piston-and-cylinder assembly has a first port 22 and a second port 24 connected to a main cylinder 26. The first port 22 is positioned at one end of the main cylinder 26 and is connected to the permeate outlet 20 of the crossflow filter 12. The second port 24 is connected to a side of the main cylinder 26. The longitudinal axis of the second port 24 is transverse to the longitudinal axis of the first port 22. The second port 24 allows the filtered permeate to pass from the interior of the cylinder 26. In normal use, the first port 22 is in fluid communication with an interior chamber 28 within the cylinder 26. Similarly, the second port 24 is also in fluid communication with this interior chamber 28.

Importantly, a piston 30 is slidably positioned within the interior of the main cylinder 26. The piston 30 is a conventional plunger-type piston having a diameter slidably fitted within the interior of the main cylinder 26. The piston 30 is movable between a first position (illustrated in broken line fashion) blocking the fluid flow between the first port 22 and the second port 24 and a second position (illustrated in solid lines) which permits fluid flow between the first port 22 and the second port 24. When the piston 30 is in the second position, each of the ports 22 and 24 will be in fluid communication with the interior chamber 28. The size of the interior chamber 28 is defined by the distance between the bottom surface 32 of the piston 30 and the port 22. As can be seen, when the piston 30 is in the first position, the piston 30 will effectively seal the interior of the main cylinder 26 so as to stop fluid flow from passing from the first port 22 to the second port 24. Since the outer wall of the piston 30 is in generally fluid-tight relationship with the interior wall of the main cylinder 26, the movement of the piston 30 from the second position to the first position will cause the backpulsing action which affects the crossflow filter 12. When the piston 30 moves from the second position to the first position, the fluid contained within the interior chamber 28 will be forced outwardly through the first port 22, into the permeate outlet 20, and into the interior of the crossflow filter 12. As such, the action illustrated in FIG. 3 will be carried out by the action of the backpulse piston-and-cylinder assembly 14.

Under normal usage, the crossflow filter 12 will have a system fluid pressure between the feed inlet 16 and the concentrate outlet 18. So as to allow for the proper backpulsing action to occur, it is necessary that the piston 30 be moved so as to exert a pressure on the fluid within the chamber 28 greater than the system fluid pressure within the crossflow filter 12. Under normal conditions, the piston will exert between twenty to fifty p.s.i. greater than the system fluid pressure.

Importantly, the piston-and-cylinder assembly includes an actuator 34. The actuator 34 is a pneumatic cylinder which is positioned within the interior of the main cylinder 26. The pneumatic cylinder 34 is connected by a rod 36 to the piston 30. A source 38 of air is connected to the pneumatic cylinder 34 so as to cause the movement of the piston 30 from the second position to the first position. Under the normal circumstances of use, the rod 36 will be connected to a piston contained within the pneumatic cylinder 34. The air pressure exerted on the face of the piston within the air cylinder 34 will cause the rod 36, and the associated piston 30, to move downwardly within the main cylinder 26. An air seal 39 is positioned within the interior of the main cylinder 26 so as to separate the air cylinder 34 from the interior fluid chamber 28. The piston 30 is connected to the rod 36 so as allow the distance between the piston 30 and the air cylinder 34 to be adjusted. As the piston 30 is adjusted upwardly toward the pneumatic cylinder 34, the volume of the interior chamber 28 will increase. As such, the volume of the interior chamber 28 can be varied so as to accommodate the demands for the backpulsing activity. If a greater amount of fluid is required for the proper backpulsing of the crossflow filter 12, then the volume of the chamber 28 can be expanded by moving the piston 30 further away from the first port 22. Alternatively, if less fluid is required so as to carry out the backpulsing activity, then the face 32 of piston 30 can be moved closer to the first port.

The source 38 of air pressure is connected along line 40 to a control valve 42. The control valve 42 is actuated by solenoid 44. A metering device 46 is also interconnected to the valve 42 so as to control the reverse flow of air from the pneumatic cylinder 34.

In normal use, air is injected into the pneumatic cylinder 34 so as to move the piston 30 from the second position to the first position. This injection of air is controlled by the solenoid 44 relative to a temporal event (such as the passage of time) or relative to the pressure differential across the interior membrane of the crossflow filter 12. In other words, after a desired period of time has passed, air will be injected into the pneumatic cylinder 34 so as to move the piston 30 for the purposes of backpulsing the filter 12. Alternatively, if the crossflow filter 12 is becoming clogged, then the pressure differential across the interior membrane will become great enough such that the backpulsing action is warranted. A signal can be transmitted from a pressure transducer to the solenoid 44 such that the valve 42 is activated so as to allow for air to be passed into the pneumatic cylinder 34 for the backpulsing of the filter 12.

It is important to note, on the other hand, that the controlled return of the piston 30 from the first position to the second position is a desirable activity. In other words, the metering valve 46 will act as a "bleed valve" for the purpose of allowing air to escape from the pneumatic cylinder 34. By gradually allowing air to pass out of the pneumatic cylinder 34, the piston 30 will return to the second position by the system fluid pressure exerted on the face 32 of piston 30. As the piston 30 moves beyond the second port 24, then the fluid will continually flow through the interior chamber 28 into the second port 24 and outwardly of the system. A constant volume of fluid will be contained within the interior chamber 28 until the time of the next backpulsing activity.

It is important to note that, within the scope of the present invention, a hydraulic cylinder can be used in place of the pneumatic cylinder 34. Similarly, fluids can be used for the actuation of such a hydraulic cylinder.

In order to control the backpulse piston, one three way solenoid or two double solenoids can be used. Solenoids have a high degree of reliability and can be easily operated from a programmable logic controller. When a three way solenoid is used, in one position, the piston is activated and in the other position, the return stroke rate can be controlled by restricting the air flow out of the drive piston.

The material used for the backpulse piston-and-cylinder assembly 14 is 316 stainless steel, with TEFLON (TM) and VITON (TM) seals. The stainless steel is not easily corroded by most liquids for which the CFM system is used and the cleaning solutions required to clean the ceramics. The TEFLON (TM) piston seal (impregnated with carbon) is very durable, inert to most materials, and has a minimum coefficient of friction. The VITON (TM) material is a very durable sealing material which maintains good resiliency in most liquids over a wide range of temperatures.

In order to minimize the detention time of the backpulse water, and to insure that the water is fresh, it is preferable to use a two port piston-and-cylinder assembly 14. One port is attached directly to the module product port and the other port is located near the upper limit of the backstroke of the piston 14. Research has shown that the water quality at the end of a three minute cycle is always the best. At that time, the water has Just been filtered through the maximum solid layer during the cycle (the dynamic membrane) as well as the fixed 0.8 micron ceramic membrane. At the end of the three to five minute cycle, the backpulse water is very clean, fresh, and is most likely to be free of bacteria. As a result, the flow reversal liquid should be the cleanest. To provide the time period of one second or less for the flow reversal, the size of an air piston to drive the backpulse piston or the pressure must be designed so as to exceed back pressure, mechanical friction, and the dynamic force required to drive the liquid piston so as to cause the necessary flow reversal through the elements in the module.

The present invention offers a number of advantages over prior art backpulsing systems. The utilization of the backpulse cylinder insures that the fluid being used is fresh. A minimum amount of time between the backpulses eliminates the cool down and/or post-precipitation of the permeate fluid.

The use of an interior chamber defined by the position of the piston relative to the interior of the cylinder provides a calculated volume for each type of membrane being backpulsed. This ensures that permeate fluid is not being wasted by reversing more then the required volume of the permeate through the membrane. This eliminates the problem in which excess fluid reversal actually decreases the flux rather than enhances the flux on membranes.

The use of the two piston-and-cylinder assembly arrangement allows the number of valves required for the flow reversal to be limited to the single valve controlling the pressure to the drive piston. If the backpulse piston is a common cylinder, then the total number of valves required would be two (one for the drive cylinder and one to shut off the permeate flow prior to the backpulse cycle). The use of the backpulse cylinder eliminates the need for a pressure pump, a storage tank, a pressure tank, a pressure tank charge system, level controls, alarms and shut downs, valves and relief valves, pressure coating of vessels where required, and the associated piping. By eliminating the accumulator tank, problems of bacterial growth and/or post precipitation of compounds in the water are eliminated. In the present invention, the interior chamber formed by the surface of the piston and the interior of the cylinder does not have a "dead area". As such, the problems associated with the backpulsing of bacteria, and associated particulates, is eliminated by the piston-and-cylinder assembly of the present invention. The elimination of the accumulator tank system also avoids the failures due to the numerous electrical/mechanical devices employed in the system. The simplicity of the configuration of the present invention greatly reduces the potential for failure and shut down.

The present invention utilizes a "bleed valve" for the purposes of providing a slow opening of the piston relative to the ports of the cylinder. This enables the product flow to refill the backpulse chamber by returning the piston to the original starting point. The slow reversal of flow allows a thin dynamic membrane to be deposited on the membrane surface in a controlled manner. Experience has demonstrated that the dynamic membrane is easier to remove, if a thin layer is allowed to coat the membrane surface prior to the return of the full product flow through the membrane.

The cost of the present invention is approximately fifty to seventy-five percent less than that of current systems employed for meeting the backpulsing requirements for present CFM systems.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

We claim:

1. A filtration system comprising:

a crossflow filter having an interior membrane, said crossflow filter having a feed inlet and a concentrate outlet and a permeate outlet, said interior membrane interposed between said feed inlet and said permeate outlet;

a backpulse piston-and-cylinder assembly having a first port connected to said permeate outlet and a second port positioned at a different location than said first port, said assembly having an interior piston movable between a first position blocking fluid flow between said first port and said second port and movable to a second position permitting fluid flow between said first and second ports; and actuation means connected to said piston for moving said piston from said second position to said first position, said actuation means comprising:

a pneumatic cylinder having a rod connected to said piston; and a source of air pressure connected to said pneumatic cylinder so as to move said piston from said second position to said first position, said pneumatic cylinder having a bleed valve means connected thereto, said bleed valve means being operable for allowing air to flow with resistance from said pneumatic cylinder relative to a movement of said piston from said first position toward said second position.

2. The system of claim 1, said crossflow filter having a system fluid pressure between said feed inlet and said concentrate outlet, said actuation means exerting a pressure on said piston greater than said system fluid pressure.

3. The system of claim 1, said piston defining an interior chamber in said assembly, said first port and said second port being in fluid communication with said interior chamber when said piston is in said second position.

4. The system of claim 3, said piston being in fluid-tight sealing relationship over said second port in said first position.

5. The system of claim 1, said piston being connected to said rod for an adjustable distance from said pneumatic cylinder.

6. The system of claim 1, further comprising:

control means connected to said actuation means for causing a movement of said piston relative to a temporal event.

7. The system of claim 1, further comprising:

control means connected to said actuation means for causing a movement of said piston relative to a pressure differential across said interior membrane.

8. A filtration system comprising:

a crossflow filter having an interior membrane, said crossflow filter having a feed inlet and a concentrate outlet and a permeate outlet, said interior membrane interposed between said feed inlet and said permeate outlet;

a backpulse piston-and-cylinder assembly having a first port connected to said permeate outlet and a second port positioned and aligned differently than said first port, said assembly having an interior piston movable between a first position blocking fluid flow between said first port and said second port and movable to a second position permitting fluid flow between said first and second ports; and actuation means connected to said piston for moving said piston from said second position to said first position, said crossflow filter having a system fluid pressure between said feed inlet and said concentrate outlet, said actuation means exerting a pressure on said piston greater than said system fluid pressure, said pressure on said piston being 20 to 50 p.s.i. greater than said system fluid pressure.

9. An apparatus comprising:

a crossflow filter having an interior membrane, said crossflow filter having a feed inlet and a concentrate outlet and a permeate outlet, said interior membrane interposed between said feed inlet and said permeate outlet;

a first cylinder having a first port and a second port, said first port connected to said permeate outlet at an end of said cylinder, said second port positioned on a side of said cylinder, said second port having a longitudinal axis transverse to a longitudinal axis of said first port, said first port positioned at a different location on said cylinder than said second port;

a piston slidably received within said cylinder, said piston movable between a first position blocking fluid flow between said first and second ports and a second position permitting fluid flow between said first and second ports, said first port having a longitudinal axis aligned with a direction of travel of said piston; and actuation means connected to said piston for moving said piston from said second position to said first position.

10. The apparatus of claim 9, said piston defining an interior chamber in said assembly, said first port and said second port being in fluid communication with said interior chamber when said piston is in said second position.

11. The apparatus of claim 10, said piston being in fluid-tight sealing relationship over said second port in said first position.

12. The apparatus of claim 9, said actuation means comprising:

a pneumatic cylinder having a rod connected to said piston; and a source of air pressure connected to said pneumatic cylinder so as to move said piston from said second position to said first position.

13. The apparatus of claim 12, said pneumatic cylinder having a bleed valve means connected thereto, said bleed valve means being operable for allowing air with resistance from said pneumatic cylinder relative to a movement of said piston from said first position to said second position.

14. The apparatus of claim 12, said piston being connected to said rod such that a distance can be adjusted between said piston and said pneumatic cylinder.

15. The apparatus of claim 9, further comprising:

control means connected to said actuation means for causing a movement of said piston relative to a temporal event.

16. The apparatus of claim 12, said pneumatic cylinder affixed to said first cylinder at an end opposite said first port, said rod extending interiorly of said first cylinder between said pneumatic cylinder and said piston, said first cylinder having an air seal interposed between said pneumatic cylinder and said piston.

* * * * *